(12) United States Patent
O'Malley et al.

(10) Patent No.: US 8,631,475 B1
(45) Date of Patent: Jan. 14, 2014

(54) ORDERING INPUTS FOR ORDER DEPENDENT PROCESSING

(75) Inventors: Michael J. O'Malley, Lowell, MA (US); John G. Brainard, Sudbury, MA (US)

(73) Assignee: EMC Corporation, Hopkinton, MA (US)

( * ) Notice: Subject to any disclaimer, the term of this patent is extended or adjusted under 35 U.S.C. 154(b) by 59 days.

(21) Appl. No.: 13/332,936

(22) Filed: Dec. 21, 2011

(51) Int. Cl.
*H04L 29/06* (2006.01)

(52) U.S. Cl.
USPC ............................................................ 726/5

(58) Field of Classification Search
USPC .......................... 713/184, 182; 726/2, 5, 6, 22
See application file for complete search history.

(56) References Cited

U.S. PATENT DOCUMENTS

| | | | | |
|---|---|---|---|---|
| 5,592,553 A * | 1/1997 | Guski et al. | .................... | 713/159 |
| 7,930,554 B2 * | 4/2011 | Coulier et al. | ................ | 713/184 |
| 8,156,548 B2 * | 4/2012 | Magdi | ................. | 726/7 |
| 8,225,095 B2 * | 7/2012 | Funk | ............................. | 713/171 |
| 2010/0043063 A1 * | 2/2010 | Ueda et al. | ........................ | 726/6 |

* cited by examiner

*Primary Examiner* — Ali Abyaneh

(74) *Attorney, Agent, or Firm* — Krishnendu Gupta; Jason A. Reyes

(57) ABSTRACT

A method is used in ordering inputs for order dependent processing. Ordered inputs are derived from original inputs. The ordered inputs have an order based on values of the original inputs. Order dependent processing logic is applied to the ordered inputs, to produce a result that is derived from the original inputs.

18 Claims, 3 Drawing Sheets

ORDERING INPUTS FOR ORDER DEPENDENT PROCESSING

TECHNICAL FIELD

The present invention relates to ordering inputs for order dependent processing.

BACKGROUND

Many authentication or validation systems are dependent on processing one or more inputs in the same way or nearly the same way, or in corresponding or coordinated ways, at different locations and/or at different times, and then following up based on the results.

For example, a lossless data compression/decompression system may be used in a situation in which a compressed version of an original file may be derived at one location and may then be transmitted to another location where a decompressed version is derived from the compressed version. For the lossless aspect of the system to work properly, i.e., for the decompressed version to match the original file and therefore be valid, the compression and decompression processes must work reliably in corresponding ways so that data corruption is not introduced.

Identity authentication is another example. Methods for authenticating an identity of an entity are known that are based on something the entity knows, something the entity has, a biological characteristic of the entity (sometimes referred to as something the entity is) or some combination of those things. One such computer-based authentication method involves the communication of a secret that is unique to a particular entity or user. The entity that is seeking authentication transmits the secret to a verifier who authenticates the identity of the entity. Typically, an entity communicates both identifying information (such as a user name) and a secret (such as a password) to the verifier. The verifier typically possesses records that associate a secret with each entity. If the verifier receives a secret that matches an appropriate record, the authentication of the entity is successful. If the verifier receives an incorrect secret, the authentication fails.

Time-based authentication systems also associate an entity with a secret, typically a number, which is unique to that entity. These systems generally perform some algorithmic processing of the secret to generate an authentication code that is ultimately used to authenticate the entity. Some time-based systems use a dynamic variable to calculate a non-predictable authorization code that ultimately authenticates the entity. Here, "non-predictable" means that the authorization code is not predictable by a party that does not know the associated secret, the algorithm for calculating the code, or both. The dynamic variable may comprise any code, typically a number, which is defined and determined by the interval of time in which an authentication code is generated. The dynamic variable can change according to any interval of time, e.g., 2 minutes, 5 minutes, 1 hour and the like. Because in these systems the authentication code changes from time to time, intercepted authentication information has a limited value because it cannot be used for authentication in the future.

The user may employ a device to algorithmically compute the correct authentication code for a particular time. The algorithm is typically provided to the user in the form of a hardware token loaded with a program for carrying out the predetermined algorithm, although it may be provided as software executing on a general-purpose computer. The device may also allow the user to input a second, personally selected secret, such as a personal identification number (PIN) in order to generate a correct authentication code. Only a correctly entered PIN produces a correct authentication code for a particular time. One such device is the SECURID authentication token, available from RSA, The Security Division of EMC, of Bedford, Mass. These devices can display the generated authentication code to the user, who may then communicate the authentication code to the verifier.

For the authentication to work properly, the token at one end and the verifier at the other end must work reliably in the same way at least for algorithmic processing of inputs.

Transaction signing is another example. It has become widely accepted to conduct transactions such as financial transactions or exchange of documents electronically. Automated teller machines (ATMs) and credit cards are widely used for personal transaction and as their use expands so too does the need to verify such transactions increase. A smart card is somewhat like a credit card and includes some processing and storage capability. Smart cards are prone to fraudulent misuse. For example by a dummy terminal which is used to glean information from an unsuspecting user. Thus, before any exchange of critical information takes place between either a terminal and smart card or vice versa it is necessary to verify the authenticity of the terminal as well as the card. One of these verifications may take the form of "signing" an initial transaction digitally so that the authenticity of the transaction can be verified by both parties involved in the subsequent session. The signature is performed according to a protocol that utilizes a random message, i.e. the transaction and a secret key associated with the party.

The signature must be performed such that the party's secret key cannot be determined. To avoid the complexity of disturbing secret keys, it is convenient to utilize a public key encryption scheme in the generation of the signature. Such capabilities are available where the transaction is conducted between parties having access to sufficient computing resources.

For the transaction signing to work properly, signing at one end and verification at the other end must work reliably in the same or corresponding ways at least for the protocol or encryption scheme processing of inputs.

SUMMARY OF THE INVENTION

A method is used in ordering inputs for order dependent processing. Ordered inputs are derived from original inputs. The ordered inputs have an order based on values of the original inputs. Order dependent processing logic is applied to the ordered inputs, to produce a result that is derived from the original inputs.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Described below is a technique for use in ordering inputs for order dependent processing, which technique may be used to provide, among other things, order independent inputs for one time password (OTP) and transaction signing calculations. In at least one embodiment in accordance with the current technique, OTP and transaction signing calculations accept a number of inputs from which a signature value is produced, where, for example, the signature value may also be an OTP. Conventionally, the ordering of input parameters is known beforehand. By contrast, in at least some implementations in accordance with the technique described herein, a sorting function is defined based on the values of the input parameters to identify the order of the parameters presented to an algorithm. In such implementations, the sorting function may be implemented under the assumption that all values are known prior to calculating the OTP or signature.

Conventionally, the order of input parameters is defined statically within the algorithm implementations, and this limits the ability of customization by the user or customer with respect to the natural order of input entry for the user or customer's process. In such conventional systems, newer transaction signing algorithms offer the possibility of customization of the order of input values, but the proposals to date require that a device is manufactured defining a set order, and the token record provided to the server defines the order in a static manner.

By contrast, in at least some implementations in accordance with the current technique as described herein, it is no longer required to communicate the order of the parameters to the server, and optionally devices may be programmed in manufacturing or in the field with an order selection that matches user or customer requirements.

Figure 3:
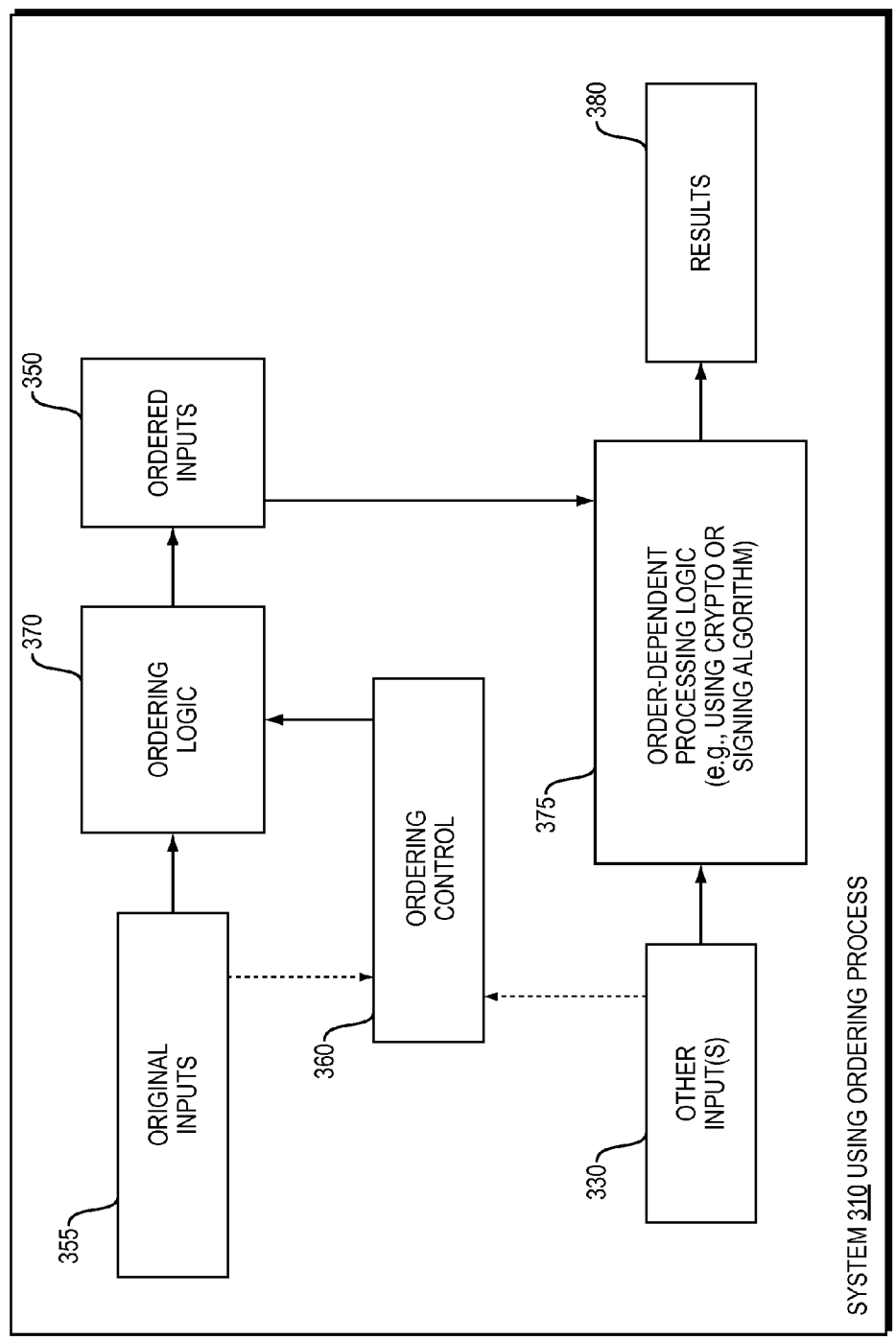

FIG. 3 illustrates an example system 310 using an ordering process in accordance with the technique described herein. Ordering logic 370 is driven by ordering control 360 to derive ordered inputs 350 from original inputs 355. For example, original inputs 355 may be a sequence of values 100, 25, 37, 5, 80. If control 360 specifies sorting from low to high, ordered inputs 350 may be a sequence of values 5, 25, 37, 80, 100. If control 360 specifies sorting from high to low, ordered inputs 350 may be a sequence of values 100, 80, 37, 25, 5. If control 360 specifies ordering by highest, then lowest, then second highest, then second lowest, and so on, ordered inputs 350 may be a sequence of values 100, 5, 80, 25, 37.

FIG. 3 illustrates that ordered inputs 350 are submitted to order-dependent processing logic 375, which may be, include, or be included in logic using a cryptographic and/or signing algorithm. Logic 375 derives a result 380 (e.g., OTP) from inputs 350 and optionally other inputs 330, which inputs 330 may also optionally be used to influence control 360 (e.g., by specifying how many values to expect within inputs 355 before inputs 350 are derived).

Depending on the implementation, control 360 may specify any order that can be determined from inputs 355 themselves, and control 360 may select an order based on characteristics of inputs 355. For example, control 360 may select one order if there are large differences among the values in inputs 355, and may select a different order if there are no large differences among the values in inputs 355. In another example, control 360 may select one order if inputs 355 have a large number of values (e.g., as specified by inputs 330) and may select a different order if inputs 355 have a small number of values.

Since the order can be determined from inputs 355 themselves, order-dependent processing logic 375 can produce the same result 380 from inputs 355 regardless of the order of inputs 355. Thus, logic 375 can be used in two instances, e.g., in two different places and/or at two different times, and can produce the same result 380 from inputs 355 in both instances regardless of whether the order of inputs 355 was the same in both instances. For example, in a first instance the original inputs 355 may be a sequence of values 100, 25, 37, 5, 80 and in a second instance the original inputs 355 may be a sequence of values 80, 25, 37, 5, 100. In the example, if control 360 specifies sorting from low to high, ordered inputs 350 is a sequence of values 5, 25, 37, 80, 100 in both first and second instances. Since inputs 350 are the same in both instances in the example, logic 375 produces the same result 380 in both instances.

Thus, in a situation in which inputs 355 are collected in an arbitrary, inconsistent, and/or unpredictable order, e.g., chronologically, determined by transmission latency, and/or by user or customer preference, order-dependent processing logic 375 produces the same result 380 regardless of the order of inputs 355.

For example, an application programming interface (API) used to pass in inputs 355 need not have mechanics to determine a required order, and different customers can use the same algorithm within logic 375 but can collect parameters in different orders.

In a case of transaction signing, inputs 355 may include values originating as financial transaction parameters, such as source account number, destination account number, amount, transaction number, and all of this information is signed to help prove that the transaction has not been tampered with. In accordance with the technique described herein, it is not necessary to use such values in a fixed order on both sides of the transaction, and such values need not be presented by one side (e.g., a token) to the other side (e.g., a server) in a preconfigured order.

In at least some cases, a user or customer may want to or need to submit values of inputs 355 in the order they are presented or collected on a web page, and such values need not be presented in a preconfigured order.

The technique may be used with any electronic signature, e.g., device signature, that takes multiple inputs where it is not specified what the values stand for.

(In at least some implementations, it is unnecessary for the other side (e.g., server) to be aware of what the transaction data is from the perspective of an algorithm. For other reasons, e.g., if the administrator wants to be able to help the end user on a support call, it may be useful to know what the transaction data is, but it is not necessary from the perspective of an algorithm. For example, in a case of an OTP token and server, the server may provide an API that allows items to continue to be added to a transaction until the server is finally asked to generate an OTP value. In such a case, a Web application is aware of what to get from a submitted form and keeps adding things until the Web application determines it is done, but the server is not aware of what is part of the transaction. Also, in the case of a situation in which the less the server knows about the customer, or how the customer if using the OTP, the better, it is useful and reasonable for the server to be unaware of what the data is, which in the absence of the technique described herein can present some support issues, e.g., if the server does not deploy homogeneous tokens or for some other reason the order of entry for tokens is not the same for all deployed tokens.)

Figure 1:
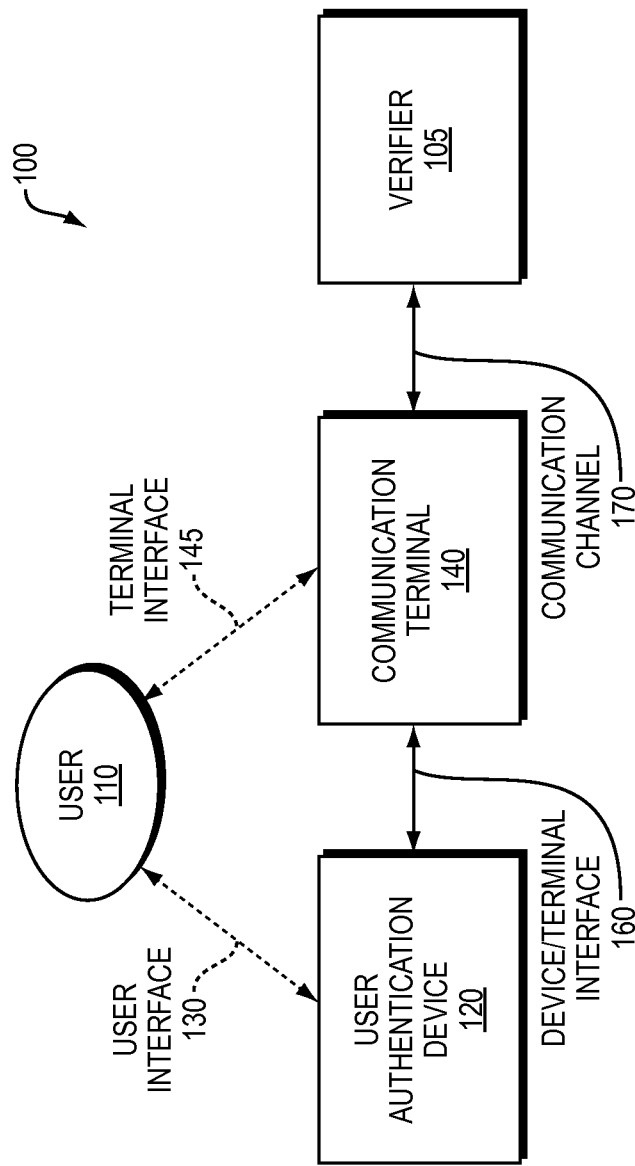
FIGS. 1-3 are examples of embodiments of a system that may utilize the techniques described herein.

Referring to FIG. 1, in one embodiment of an authentication system 100 using system 310 according to the technique, a verifier 105 may be used to help securely authenticate the identity of exemplary user 110. As used here, "authenticate" means to verify the identity of a user 110, and so "authenticate" and "verify" can be used interchangeably throughout. Also, although the specification will discuss, for simplicity, authentication of "users," it should be understood that "users" means any entity requiring authentication such as, for example, a person, animal, device, machine, or computer. The inclusion of a single user 110 is exemplary, and typically a verifier 105 can be used to verify a large number of users 110. Similarly, the inclusion of a single verifier 105 is exemplary, and typically a user 110 can have an authentication attempt verified by one or more of a large number of verifiers 105. In some embodiments, a single verifier 105 may be able to verify a user 110, while in other embodiments, two or more verifiers 105 may perform this task.

The verifier 105 can be any sort of device that implements the functions described herein. In one embodiment, the verifier 105 may be implemented as software running on a server class computer including a processor, memory and so on, to enable authentication of a large number of users, for example, in an enterprise. The verifier 105 can also be implemented as software running on a desktop computer, laptop computer, special-purpose device or personal digital assistant (PDA). For example, the verifier 105 can be implemented as a software program running on a general-purpose computer, possibly interacting with one or more other computer programs on the same or a different computer. Some or all of the verifier 105 functionality can be implemented in hardware, for example in an Application Specific Integrated Circuit (ASIC). In still further embodiments, the verifier 105 can be implemented in a cellular telephone, or specialized hardware embedded in a cellular telephone and adapted to interact with the cellular telephone's circuitry. Other sizes, shapes, and implementations are possible without departing from the spirit of the invention.

Authentication can result in the performance of one or more actions including, without limitation, providing access or privileges, taking action, or enabling some combination of the two. Access includes, without limitation: access to a physical location, communications network, or a computer system; access to such services as financial services and records, or health services and records; or access to levels of information or services. The user 110 and the verifier 105 can be physically near one another or far apart.

As illustrated, a user 110 can communicate with a user authentication device 120. The user authentication device 120 may provide information used to authenticate the user 110. The user authentication device 120 can optionally provide a user interface 130. Communication between the user 110 and the user authentication device 120 can take place via this user interface 130. The user interface 130 may provide an input interface, an output interface, or both. An input interface may enable the user 110 to communicate information to the user authentication device 120. The input interface can be any mechanism for receiving user input, and can include, without limitation: a keypad or keyboard; one or more push buttons, switches or knobs; a touch sensitive screen; a pointing or pressing device; a trackball; a device for capturing sound, voice or handwriting; a device for capturing biometric input (such as a fingerprint, retina or voice characteristic). An output interface may enable the user authentication device 120 to communicate information to the user 110 and can be any mechanism for communicating to a user, including, without limitation: a visual display to support alphanumeric characters or graphics such as a LCD display or LED display; an electrophoretic display; one or more light sources; a loudspeaker, a sound or voice generator; a vibration interface. In some embodiments, the user 110 may provide, via the user interface 130, identifying information (such as a user identifier, PIN, or password, or a biometric characteristic such as a fingerprint, retina pattern, or voice sample), or possessions (such as physical keys, digital encryption keys, digital certificates, or authentication tokens) to the user authentication device 120.

The user authentication device 120 can take various forms in various embodiments of the current technique, provided that the user authentication device 120 performs the functions required of the user authentication device 120 for secure authentication. The user authentication device 120 can be implemented in packages having a wide variety of shapes and form factors. For example, in some embodiments the user authentication device 120 can be, or be incorporated within, a telecommunications device such as a cellular telephone, or a cellular telephone with specialized embedded hardware adapted to interact with the cellular telephone's circuitry, such as a SIM card. In this example and in others, the authentication device 120 can be two components in communication with each other, for example a wireless telecommunications device and a removable accessory, such as a SIM card. In other embodiments, the user authentication device 120 can be a credit-card sized and shaped device, or can be much smaller or much larger. One credit-card sized embodiment of the user authentication device 120 includes a microprocessor with on-board memory, a power source, and a small LCD display. Embodiments may optionally include a keypad or buttons for PIN entry, entry of authentication information requests, or for other entry or interaction with the device 120. In another embodiment, a credit-card sized device 120 may include a processor with on-board memory that may be used as a "smart card," that can be installed into another device that provides power and/or an interface. In still other embodiments, a credit-card sized device 120 may be a card such as a credit card including a magnetic strip or other data store on one of its sides. In other embodiments, the user authentication device 120 may be a "key fob," that is, a smaller device with a display and battery that may be sized and shaped to fit on a key ring. In yet another embodiment, the user authentication device 120 may be a device or peripheral device combined with, and able to communicate with, a computer, telephone, or other device, such as a USB dongle or a Global Positioning System ("GPS") receiver. In still other embodiments, the user authentication device 120 can be a desktop computer, laptop computer, or personal digital assistant (PDA). For example, the authentication device 120 can be implemented as a general-purpose computer running a software program that possibly interacts with one or more other computer programs or devices on the same or a different computer or device. For example, the authentication device 120 may include a web-browser with a plug-in software component. Other sizes, shapes, and implementations are possible without departing from the spirit of the invention.

Exemplary authentication devices with which the embodiments of the current technique can be used are members of the RSA SECURID family of authentication tokens, available from RSA, The Security Division of EMC, of Bedford, Mass. Some RSA SECURID hardware devices, for example, display a generated authentication code value to a user, who then communicates the displayed authentication code value to a computer for communication to a verifier. For example, in one embodiment, the information may be a numerical value.

In some embodiments, the user authentication device 120 stores a seed or secret that may be used to help authenticate the user 110. Typically, the seed may be information that only is available to the authentication device 120 and the verifier 105.

For example, in one embodiment, the information may be a numerical value. The seed can be used to help generate an authentication code for the user 110. The user authentication device 120 can also store or access dynamic data, which, for example, can be the current time, if implemented with a running clock. The user authentication device 120 can also provide other information, or perform other calculations or combination functions, as described further below. For example, in one embodiment, in addition to a seed, the device 120 may receive a personally selected secret from the user 110 (such as a PIN or password) and generate a dynamic, non-predictable authentication code value in response to the secret received from the user 110, the seed, and the current time. Here, for example, a non-predictable authentication code value may be unpredictable to anyone who does not have access to the secret received from the user 110, the stored secret, and the algorithm that generates the authentication code value. The user authentication device 120 optionally can also receive other input, such as verifier identification, and use that and/or other additional information in the generation of the authentication code value. User 110 optionally (and depending on implementation) has one or both of direct access to the communications terminal 140 and indirect access to the communications terminal 140 via the user authentication device 120. The communications terminal 140 can take various forms in various embodiments, including without limitation: a card reader; a device receptacle, cradle, or holder; a personal computer; a telephone; a personal digital assistant (PDA); a network interface card; a wireless transceiver. During the authentication process the user 110 can directly communicate information to only the device 120, only the terminal 140, neither the device 120 nor the terminal 140, or both the device 120 and the terminal 140. Likewise, the communications terminal 140 can receive direct input from the user 110, the user authentication device 120, or both. As shown, the user 110 optionally communicates directly with the communications terminal via the terminal user interface 145 that can be present depending on the implementation of the communications terminal 140. Like the device user interface 130, the terminal user interface 145 can include an input interface, an output interface, or both. The input and the output interfaces can take one or more of the forms described above for the device user interface 130, or other forms.

The communications terminal 130 can optionally provide a device/terminal interface 160 for communications between the terminal 140 and the user authentication device 120. In one embodiment, this interface could take the form of a wired or wireless communications channel between the terminal 140 and the device 120, using standard or proprietary protocols. For example, in an embodiment in which the device 120 is a smart card and the terminal 140 includes a card reader, the communications interface 160 could be a wired serial communications link between the smart card and the reader. In another embodiment in which the device 120 is a telecommunications device and the terminal 140 includes a wireless transceiver, the interface 160 could be a wireless link.

The communications terminal 140 can provide a user interface 130, via a terminal interface 145, without providing a device interface 160 for the device 120. For example, the terminal 140 can be a telephone that the user 110 uses to communicate authentication information to the verifier 105. In such an embodiment the user authentication information can be represented as tones associated with a series of alphanumeric digits. In this embodiment the user 110 may dial a telephone number to establish a communications connection with the verifier 105 and performs a series of key presses on the telephone to communicate the alphanumeric user authentication information to the verifier 105.

The terminal 140 and the authentication device 120 can each be integrated, together or separately, into another device, likewise, the functionality of the terminal 140, the device 120, and their respective interfaces 130, 145, 160 can be implemented in separable components. For example, the authentication device 120 can be implemented as an add-in card to a handheld computer (not shown) or as a plug-in software component. A handheld computer may provide the user interface 130 and also provides the terminal 140 in the form of a wireless network interface. Likewise, a mobile telephone can provide terminal 140 and user interface 130 functions, while the mobile telephone, or a plug-in component such as a SIM card, provides some or all the authentication device 120 function.

The communications terminal 140 may communicate information to the verifier 105 via a communications channel 170. The communications channel 170 can be any method and/or interface that enables communication of information to the verifier 105 that may be required to authenticate the identity of the user 110. The communications terminal 140 can communicate information generated by the user 110, the device 120, or both, to the verifier 105 over a communications channel 170. The communications terminal 140 and the verifier 105 can implement the communication channel 170 through a variety of connections including standard telephone lines, LAN or WAN links (e.g., 802.11, T1, T3, 56 kb, X.25), broadband connections (ISDN, Frame Relay, ATM), and wireless connections. Connections between the communications terminal 140 and verifier 105 can be established using a variety of communication protocols (e.g., TCP/IP, IPX, SPX, NetBIOS, Ethernet, RS232, and direct asynchronous connections). The verifier 105 may process the information received from the communications terminal 140. The verifier 105 can perform actions in response to authenticating the identity of the user 110. For example, the verifier 105 can grant on-line access to data or physical access to restricted areas or physical items.

The authentication code values (e.g., one or more results 380) communicated over the communications channel 170 can be implemented to be dynamic and unpredictable (to an observer without knowledge of the algorithm and/or values used to generate the authentication code values and/or access to previous user authentication attempts) for each user authentication attempt. In some embodiments, the algorithm is selected such that the authentication code is non-predictable even if the algorithm is known to the attacker. Also, the algorithm may be selected such that knowledge of a large set of previous authentication attempts for a multiplicity of users would not make an authentication code predictable to an attacker. The authentication code can also communicate event state information, as described further below.

For each user authentication attempt, the verifier 105 receives user authentication information and verifies the received information. As described further below, in some embodiments, the verifier 105 also determines an event state indicating whether one or more events have occurred, and optionally, in some cases, the nature of an event. In some embodiments, in order to authenticate the user, the verifier 105 performs algorithmic calculations for each user authentication attempt that is substantially identical to the algorithmic calculation performed by the user authentication device 120. In some embodiments, the verifier 105 can determine authentication codes for a number of possible events and event states such that a number of authentication codes that can successfully authenticate the user 110 are possible. The verifier 105 compares the authentication information received over communications channel 170 and the authentication information generated by the verifier 105 to determine whether any match. If there is a match, then the verifier 105 can authenticate the identity of the user 110 depending on the event state determined. In one embodiment, when the received and generated user information do not match, the user authentication attempt fails. In some embodiments, the verifier 105 can communicate positive or negative acknowledgement to the communications terminal 140 via the communications channel 170, and the terminal 140 may or may not communicate the acknowledgement to the device 120 or directly to the user 110. In further embodiments, where a plurality of authentication codes that can successfully verify the user 110 are possible, the verifier 105 first determines an expected authentication code for an expected event state, and if the verifier 105 receives a different authentication code, determines and compares authentication codes for other possible event states before indicating whether the authentication device has been successfully verified. Note that there can be other possible authentication codes as well, for example due to a generation value increment (described further below) and imprecisely synchronized time clocks between the verifier 105 and the authentication device 120.

In one embodiment, a determination by a verifier 105 of an event occurrence triggers a restriction on the activities of a user 110, rather than a complete denial of access. The restriction can be based on the type of events that have occurred since the preceding authentication attempt. For example, a workstation user's access to highly confidential information can be eliminated while access to non-confidential information continues to be permitted when the user's PIN was entered into the authentication token incorrectly more than a specified number of times.

The user authentication device 120 can maintain event state data which indicates whether an event has occurred. The reportable event(s) about which the event state is maintained may be unusual events that do not occur during normal operation of the device. Examples of such anomalous events include tampering with the device, an environmental event (e.g. aberrant temperature), incorrect power supply, or radiation detection. Other examples of reportable events can include, without limitation, device location (e.g., is the device in a specific building, room, city, country, region, or some combination); the length of time a device (e.g., if a card, token, etc.) is inserted in a reader (possibly indicating that a user left an unattended device in the reader); authentication quality (e.g., a number of PIN errors prior to successful authentication, strength of a biometric match, etc.); device signature or pattern (e.g., the device generates a pattern or sequence of bits that can be checked by the verifier, and the event state indicates the current bit in this pattern); related authentication (e.g., the verifier can determine whether access to network resources is being requested from a physical location that the requestor entered in an authorized manner); and location of the seed (e.g., event state indicates whether a seed is in an approved hardware device (e.g., a card, token, etc.) or has been transferred (e.g., downloaded to a software container such as a laptop)). Some reportable event states may be unique to a particular type of authentication device 120. For instance, in an embodiment where authentication device 120 is a telecommunications device, the use of an unauthorized SIM card or connecting an unauthorized device to the telecommunications device may be reportable event states. The size of the event state data can depend on the number of possible event states. For example, for four event states, only two bits are needed (i.e., the values 00, 01, 10, and 11 each represent event states). For seven states, three bits, and so on. Thus, taking geographic location as an example, three bits can be used to indicate one of seven possible locations, or a much larger number of bits can be used to indicate longitude/latitude.

An event occurrence may result in a change in the event state kept by the user authentication device 120, with the further result that the authentication code generated by the user authentication device 120, with high probability, may be different than otherwise expected by the verifier 105. The verifier 105 can determine whether a received identity authentication code is associated with one or more events, and if it is, take appropriate action, such as warning an administrator or restricted access.

The event state need not have a specific meaning to the verifier 105. For efficiency, the verifier can determine which event state(s) are most likely and initially check authentications with the authentication codes associated with the most likely event state(s). The verifier can verify authentication codes with the most likely event state information to determine whether the event state that is being signaled is either valid (e.g., expected) or invalid (e.g., unexpected). Additionally, the interpretation of the event state can be accomplished outside of the verification process. In one embodiment, the event state information is analyzed and interpreted by an entity who is not a verifier in order to determine what event the event state is signaling, e.g., tampering or low battery. The verifier can communicate the event state information to a service that can interpret the event state.

When the verifier checks authentication codes for their correspondence with likely individual event states, the efficiency of the verifier's operation may depend on the number of likely event states. For example, if there are only two likely event states, then the verifier may only perform, at most, two checking operations, whereas if there are ten likely event states, the verifier may perform as many as ten checking operations. The verifier may be able to accommodate a significant number of event states in this manner. However, in some embodiments, the verifier can accommodate an increased number of event states because the authentication code may provide a hint to the verifier about the event state. In other embodiments, the event state may be provided in a way that can otherwise be recovered from the authentication code without checking all likely individual event states. In such embodiments, the efficiency of the verifier's operation may not depend on the number of such event states.

Since each likely event state may correspond to a different authentication code, the probability that a random authentication code is accepted by the verifier may increase as the number of likely event states increases, particularly if the length of the authentication code is fixed. Accordingly, it may be prudent to increase the length of an authentication code as the number of likely event states increases in order to keep the probability that a random authentication code is accepted sufficiently small. For example, if there are ten likely event states, then the length of the authentication code may be increased by one numeric digit.

As a simple example, in one embodiment, the user authentication device 120 can maintain a temporary event state data store. In this example, prior to the occurrence of an event, the event state data store may equal zero. In some embodiments, as explained further below, the contents of the event data store may be utilized, at a predetermined time, to help generate an authentication code produced by the device 120 that is communicated to the verifier 105. Upon the occurrence of a specific event, the event state data store can be modified to be, for example, one hundred. In an example embodiment, the authentication device 120 may include a switch activated by the opening of the case of the authentication device 120, such that if the device 120 is opened, the switch causes an interrupt, which causes the processor in the authentication device 120 to change the contents of the event data store to one hundred. Initially, the event state data may not be used to help generate an authentication code. Rather, at a predetermined time, the contents of the event data store can be used in such a way as to help generate an authentication code that differs from the expected authentication code by exactly one hundred. When the verifier 105 receives the authentication code it can immediately recognize that a received authentication code (i.e., the second authentication code) is not the initially expected authentication code. The verifier may also recognize that the received authentication code is different than expected by a value of one hundred. The verifier can then conclude that the event that triggers the change in event state data (in this case, opening of the authentication device) has occurred. In further embodiments, different events may change the authentication code differently (e.g., add one, ten, etc.). In yet further embodiments, multiple events may occur before an authentication code is generated using the event state data and may change the authentication code differently. In these embodiments, different events may be recognized depending on the resulting authentication code. As described further below, certain techniques can make it easier for the verifier to determine if an event occurred, while being much harder for an attacker to determine that an event occurrence was detected. The switch can be any means that provides a state change if the authentication device 120 is opened or otherwise tampered with including, without limitation, a separable contact surface, or any form of limit switch such as a pushbutton switch, rocker switch and the like.

In at least one embodiment, in order to authenticate the user 110 and determine the event state of the authentication device 120, the verifier 105 performs an algorithmic calculation on a received authentication code that "reverses" some or all of an algorithmic calculation performed by the user authentication device 120. In a simplistic example, the user authentication device 120 generates an authentication code by arithmetically combining a secret stored by the user authentication device 120 and a user-supplied PIN. In order to verify the user in this example, the verifier may retrieve from its records the PIN associated with the user and the secret stored on the user's authentication device 120. The verifier 105 reverses the combination operation, e.g., by subtracting and/or XOR the user's PIN from the received authentication code. The verifier 105 can compare the result after PIN removal to the value of the secret stored on the user's authentication device 120, or to the value that should have been generated at that time by the device 120 using the stored secret. If they match, the user may be authenticated. If they do not match, user authentication may fail. In some embodiments the verifier 105 decrypts a value encrypted by the user authentication device 120 using symmetric key encryption or asymmetric encryption techniques, such as public key encryption. In some embodiments, the verifier 105 also calculates the authentication code with data that indicates whether one or more events have occurred. In other versions, the verifier 105 calculates the authentication code with data that indicates whether an event has occurred, and also indicates additional information concerning the event.

In other embodiments, a first authentication of user 110 can be performed by the user authentication device 120 based on information supplied to the authentication device 120 by the user 110. For example, the information supplied by the user may be a PIN, a password or biometric information. The device 120 may perform this first authentication alone or in combination with another device. If the first authentication is successfully verified by the authentication device 120, the device 120 can generate an identity authentication code which is verified by the verifier 105. In a further embodiment, the first authentication can be a local authentication performed in the presence of the user 110.

Figure 2:
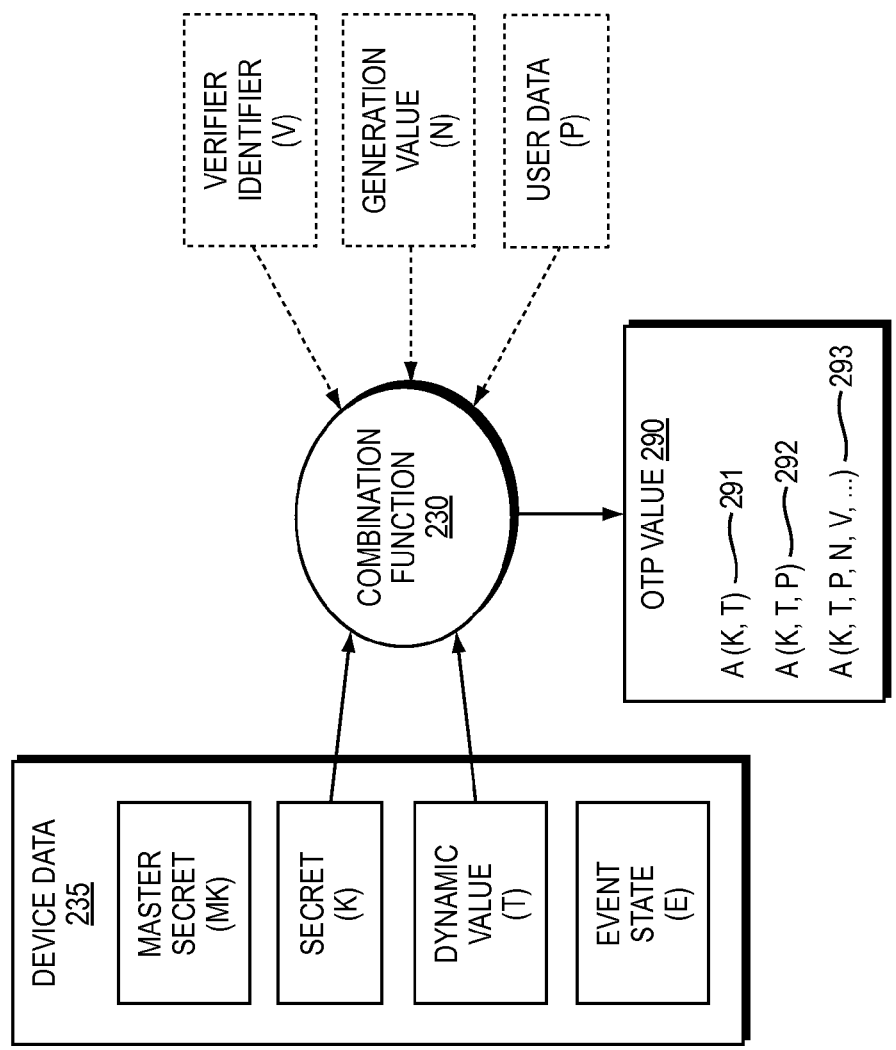

FIG. 2 depicts one embodiment of the user authentication device 120 and verification computer 140 of FIG. 1 in which various values (including inputs 355) are inputted and combined by a combination function 230 to generate an authentication code 290. Function 230 includes system 310 such that inputs 355 need not be supplied to function in any predefined order. It should be understood that the manner of combination and the input provided to the combination function 230 could vary from these examples. In one embodiment, result 380 including an authentication code 290 may be constructed from inputs 355 including device data 235, which may include a secret (K) and a dynamic, time-varying value (T) generated by the user authentication device 120.

Other example inputs 355 that may be used include the time and date of manufacture of the user authentication device 120, the amount of time since generation of the last authentication code, an encoding of the latitude and longitude of the location of manufacture of the user authentication device 120, an encoding of the location of the user authentication device 120 at the time of generation of the user authentication device (using GPS or enhanced GPS, for example), or other similar quantities. The combination function 130 may also optionally use further inputs 355 such as one or more of user data (shown in phantom view as user data (P)) or verifier data (shown in phantom view as verifier identifier (V)) and a generation value (shown in phantom view as generation value (N)) to generate an authentication code (A) 290 for the user. Examples of user data include data derived from biometric information such as retinal scans and fingerprints; identifying information such as social security number, birth data (possibly including time of birth); and unique names and numbers, or other information. Verifier data can include information identifying the verifier 105, such as a name, number, IP address, or processor serial number. A generation value N can indicate the number of authentication codes requested in a specified time period.

The combination function 230 may be implemented as instructions executed by a computer, for example, by firmware instructions executed by an embedded microprocessor. In other embodiments, the combination function 230 may be implemented in special-purpose hardware, such as an application specific integrated circuit, a field-programmable gate array, or other programmable logic device. In still other embodiments, the combination function 230 may be implemented as a software application program running on a general-purpose desktop, laptop, or handheld computing device.

FIG. 2 depicts a number of embodiments for generating authentication code 290. In one embodiment, authentication code 291 is constructed from a stored secret (K) and a dynamic value (T). In this embodiment, the authentication code (A) 291 is represented as a function of elements K and T, which is written A (K, T).

The combination function 230, and the elements of the combination function may be implemented in the device 120, the communications terminal 140, or some combination of the two.

The stored secret (K) can be a unit of information such as a numerical value that may be, in some embodiments, based on a value that is manufactured into and stored inside the device 120 such that it can be very difficult to extract from the device. In a typical software implementation of the device 120, the secret (K) may be stored in a data store, preferably secure, and accessible to the device 120. In addition to being accessible to the device 120, the secret (K) may also be stored in a secure data store accessible to the verifier 105. In some embodiments, only the device 120 has access to the secret (K), and the verifier has access to a function of the secret (K), or vice-versa. In some embodiments the device's 120 secret (K) corresponds to, but may not be the same as a value stored with the verifier 105, for example, where each has one of a pair of keys in a public key cryptosystem. In other embodiments the secret (K) can be derived from a master secret (MK), as described below, which may be the value that is manufactured and stored inside the device 120. In some embodiments, the secret (K) can be a value that is chosen from a large number of possible values such that it would be difficult for an attacker who had access to the output of the combination function 230 to guess the secret by trying each possible secret value to see if it resulted in the observed authentication code value. In one particular embodiment, the secret (K) may be selected from the group of numbers that are 128 bits in length.

The dynamic value (T) may be a unit of information such as a hexadecimal or decimal numerical value that changes over time. In one embodiment, the dynamic value (T) is uniquely associated with a particular pre-determined time interval demarcated by a particular starting time and ending time. The time interval may not be required to be of any particular length nor may every time interval be required to be the same length. The only requirement is that the time interval schedule be roughly synchronized between device 120 and verification computer 150. Methods that may be used to synchronize device 120 and verification computer 150 are described in U.S. Pat. No. 4,885,778, titled "Method and Apparatus for Synchronizing Generation of Separate, Free Running, Time Dependent Equipment." A time interval could have the length of a minute, an hour, a month, a year or any other convenient length of time. The dynamic value (T), identifying a particular time interval, remains constant for all authentication codes generated within that particular time interval.

For example, in one embodiment, a constant time interval of a minute can be used, and the dynamic value is the number of minutes since Midnight, Jan. 1, 1980. In another embodiment, a time interval of an hour can be used and the dynamic value may be the number of seconds since Noon, Dec. 15, 1999. The number of seconds can be determined for the first second of each time interval. In such an embodiment, the time from which counting begins may be a secret that is shared between the device 120 and verification computer 150. The interval period length(s) may also be secrets that are shared between the device 120 and the verification computer 150.

In another embodiment, the length of each time interval may be an hour. Since, there are 24 hours in a day, each hour can be identified by a unique value such as the values 1 through 24; each of the 365 days of the year can be uniquely identified by the values 1 through 365; and each year can be identified by the number of the year, for example 2001. These three values, each identifying an hour, a day or a year, are combined in such a manner to produce a value that uniquely identifies one and only one particular one-hour time interval. This one hour time interval can be indicated by a particular (hour-day-year) combination. For example, the value 100232001 would uniquely identify the period of time between 9:00 am and 10:00 am on the 23rd day (023) of the year 2001 (2001), that is Jan. 23, 2001. Similarly, the value 170322001 would uniquely identify the time period between 4:00 pm and 5:00 pm on the 32nd day (032) of the year 2001 (2001), that is Feb. 1, 2001. Other variations will be immediately understood by those of ordinary skill in the art.

In one embodiment, the dynamic value (T) is provided as the output of a time clock function. The time clock function may provide the current time to the dynamic value function. The dynamic value function determines the appropriate dynamic value (T) in response to the data provided by the clock function. In one such embodiment, implemented in a device having a clock and a processor, the dynamic value (T) is generated by a clock that is a counter that is set to an initial value and is incremented every second. This clock counts the number of seconds since the initially configured time. Every sixty seconds the clock signals the dynamic value function, which reads the clock, increments the dynamic value (T), and stores the incremented dynamic value as the dynamic value (T) for that time interval. In some embodiments the time value is provided in ISO-8601 format.

In one embodiment, the secret (K) and the dynamic value (T) are provided to the combination function 230 for combination as authentication code A (K, T) 291. The combination of the secret (K) and the dynamic value (T) can take place in any order and may use one or more various combination methods. For example, in at least one embodiment, a one-way function such as a hash function, can be applied to one or more of the values (K, T), and the result truncated to the right length, in order to arrive at a resulting authentication code. A one-way function is any mathematical function that maps a universe of input values to a universe of output values in such a way that knowledge of the output of the function does not allow one to reconstruct the input provided. An example of a one-way function is a hash function, such as MD4, MD5, or SHA-1. In one particular embodiment, a block cipher, such as RC6 or Rijndael, use the secret (K) as the key and the dynamic value (T) as the data in order to generate the combination of (K) and (T).

User data (P) can also be provided as input to the combination function 230. In at least one embodiment, the user data (P) can be a unit of information such as an alphanumeric character string, or a strictly numerical value, for example a personal identification number (PIN) or password. In one embodiment, the user data (P) can be information uniquely associated with the user 110. The user data (P) can also be obtained by biometric measurement or observation. In one embodiment, the identity or value of the user data may be a secret known only to the user 110 and the verifier 105 (i.e., not to the device). The user data (P) can be stored in a manner accessible to the verifier 105 that protects it from being compromised. The user data (P) can be, for example, the actual PIN, password, or biometric data that is provided by the user, or the user data value (P) can be the result of processing of the user data by one or more other functions. For example, the user data (P) can be mapped to another value with a one-way function, such as a hash function, or a key derivation function before being provided as an input to the combination function 230. Derivation functions can be used that combine the password with other information. For example, to increase security a random string of information referred to as a salt can be combined with the password prior to the application of a derivation function. The salt need not be a secret value. An iterative function can also be included in a derivation function. A number, referred to as an iteration count, can be used to indicate how many times to perform an underlying function by which the password is derived. The incorporation of the iteration count into a derivation function increases the effort required to derive a password. A modest number of iterations, for example 1000, is not likely to be a burden for legitimate parties when computing a key (e.g., user data), but it may be a significant burden for attackers. If the user data value is random and selected from a large number of possible values, a smaller iteration count can be used.

In one embodiment, the combination function 230 combines the user data value (P) with the secret (K) and the dynamic value (T) to generate an authentication code A (K, T, P) 292. The combination function 230 can combine these values (K, T, P) in any order (and with other values not mentioned) to generate the authentication code 292. In one particular embodiment, the user authentication device 120 may first combine (K, T) to generate an authentication code A (K, T) 291 as described above. The combination function 230 may then combine the generated authentication code 291 with the PIN (P) to generate an authentication code 292 that is a function of (K, T, P). The PIN (P) can be combined with A (K, T) by prepending or appending the PIN (P) to A (K, T), by arithmetically adding the PIN (P) to A (K, T), or using a block cipher or other one-way function, or other algorithm, or a combination of these and other techniques that combine two or more input values together. The same steps can be used for both combinations, or they can be different—for example, (K) can be provided as key input to a block cipher and (T) as data inputs to the block cipher, and the PIN combined with the block cipher result by an addition or exclusive-or operation. In another embodiment, the user data value (P) and the event state (T) are combined first for use as input to an encryption function, and then the secret (K) are combined with them by using them as a key to encrypt the result. In another embodiment, the dynamic value (T) and the secret (K) are combined, and the user data value (P) are combined with the result. The combination can take place at the same time, for example, as the values are provided as input to a single function, or in stages, as some values are combined with others. Certain combinations can take place on the user authentication device 120 while others can take place on the communication terminal 140. Of course, it should be understood that the combination can include as variations other values or processing.

As described, various embodiments of the device 120 can receive input of the user data (P) in various ways. These can include without limitation, user input (e.g., of a PIN) via a keypad, a keyboard, a touch sensitive screen, selection with a pointer or mouse, handwriting recognition, voice recognition and so on. The user data can be read using a biometric reader that is integrated with the authentication device 120. The user data (P) can also be communicated from another device via electrical or electromagnetic means. It should be understood that there can be more than one item of user data (P), for example, provided by PIN entry and a fingerprint reader. Likewise, as another example, a PIN can be verified by the device, and data provided to the combination function in response to successful verification of the PIN by the device.

In various other embodiments, other data can be combined with the data just described (i.e., with or without the user data (P)) to generate the authentication code 293. This other data can include a generation value (N), which is incremented for each authentication code requested within a time interval. See co-assigned U.S. Pat. No. 7,363,494, entitled "METHOD AND APPARATUS FOR PERFORMING ENHANCED TIME-BASED AUTHENTICATION", the entirety of which patent is hereby incorporated by reference herein.

The other data can include a verifier identifier (V), which may be a value associated with the identity of a particular verifier (105) or group of verifiers. The use of the verifier identifier (V) may allow the same user authentication device 120 (with the same secret (K)) to be used with verifiers operated by different entities without giving a particular entity information that could be used to impersonate the user to another entity. See co-pending U.S. patent application Ser. No. 09/304,775, entitled "System and Method for Authentication Seed Distribution," by Brainard et al., the contents of which are hereby incorporated herein by reference.

For example, in one embodiment, the combination function 230 combines inputs 355 including a secret (K), a dynamic value (T), user data (P), verifier identifier (V), and a generation value (N) to generate an authentication code 293 as result 380. The combination function can combine these values (K, T, P, V, N) in various ways and in any order. Before being combined by the combination function 230, these values can be processed by one or more other functions such as logic 370. Various embodiments of the authentication device 120 can receive input of this data in various ways.

With reference to FIG. 3, in another example, relating to transaction signing, systems and methods may be provided for protecting transaction information (original inputs 355) stored in a database of, in the example, a gaming network. To accomplish this, a transaction signature (result 380) is generated (by logic 375) each time the user completes a transaction on a gaming machine. The transaction signature is generated using transaction information from a particular transaction. The transaction signature and transaction information are stored together in a network database. Upon subsequent access to the transaction information in the database, the transaction signature for the transaction information is recalculated based on the transaction information at that time. The new transaction signature is then compared to the transaction signature previously stored. Any differences between the two transaction signatures may be used to signal unauthorized alteration in the database transaction information.

A portable credit device is carried by the player. The credit device may be a magnetic card, cash voucher, ticket, or any other form of portable credit device.

Here, the ticket displays one or more transaction information elements (inputs 355). The transaction information elements may include, for example, a casino identification, a ticket identification, a validation number, a date, a time, a ticket number, a value, and a machine identification number. The validation number is a unique number generated within the network such that each ticket and transaction may be uniquely identified. In one embodiment, the time refers to the time when the ticket is printed. Other transaction information elements which may be stored on the tickets include a cluster controller address, ticket status, status change time and other related information. The ticket is typically produced each time a player completes a transaction on a gaming machine.

A transaction signature is generated to protect transaction information from tampering. The transaction signature is computed by logic 375 using one or more of the transaction information elements (inputs 355) (e.g., a combination of casino ID, time, and value). Generating the transaction signature may be performed at various times and from various sources. In a preferred embodiment, a transaction signature is generated in conjunction with the network central database each time the user completes a transaction with a gaming machine. In this case, the transaction signature is generated from transaction information elements included in the most recent transaction. The transaction signature may also be generated from other information such as the status of the credit device, the time the ticket was generated, the amount on the ticket, etc. After generation of the transaction signature, the transaction information (inputs 355) and transaction signature (result 380) are stored (preferably in the central database) for subsequent access and verification.

Generally speaking, a transaction refers to interaction of a player with a gaming machine. Typically, the transaction begins when the player inserts credit into the machine. The transaction includes the player participating in one or more games on the machine. Usually, during the course of a game, the player is required to make a number of decisions that affect the outcome of the game. After the player has completed interaction with the gaming machine, the transaction is finished and the player may receive a credit device from the machine which includes any credit resulting from interaction with the gaming machine.

The transaction information used for generating the signature may vary. Broadly speaking, the transaction information used in generating the transaction signature may include any data or information related to a transaction between a player and a gaming machine. The transaction information used for generating the transaction signature need not be characteristic or unique by itself, but may be processed to provide a characteristic transaction signature. A characteristic transaction signature refers to a transaction signature which is substantially unique within a database. In some embodiments, the transaction information used for generating the signature may include the user's identification (e.g., name or number), transaction termination time, a machine identifier, casino identification, final transaction value, ticket validation number, ticket printer time, machine identifier, cluster controller address, ticket status, or some combination thereof.

Any technique for generating the transaction signature from the chosen transaction information (the seed value(s)) may be employed. Preferably, it is a technique that cannot be readily discerned from the other information stored with the signature (e.g., other information in a database record). In some embodiments, a specific algorithm is used to translate the transaction information into the transaction signature. The resulting transaction signature produced by the algorithm may take the form of a string of characters. The string of characters may include computer-generated symbols such as numbers, letters, symbols, etc. For simplicity, the transaction signature is preferably provided "in the clear"; i.e., without encryption of the string of characters. In another embodiment, the string of characters may be encrypted to improve protection. As one skilled in the art would appreciate, there exists an abundant number of ways to create an encrypted key from the transaction information and the present invention may include any such encryption algorithm or mechanism (logic 375).

In other embodiments, the algorithm used to produce the transaction signature may vary over time to improve transaction information protection. By way of example, the algorithm may change every week. In one embodiment, the information used in generating the signature may change. For example, in one week, the transaction information used for generating the signature of a ticket may include the user's name, the ticket print time and a machine identifier. The next week, the transaction information used for generating the signature may include the user's name, the gaming machine identifier and the final transaction value on the gaming machine. In addition, the order specified by control 360 may also change to vary the algorithm and transaction signature.

One exemplary algorithm for creating transaction signatures suitable for use with the current technique is a cyclic redundancy check (CRC) algorithm, which is order dependent. Specific algorithms suitable for use with the current technique include the CRC-16 algorithm and the CRC-32 algorithm. As one skilled in the art would appreciate, there exist an abundant number of algorithms to create an encrypted key from the transaction information and the current technique may be used with any such algorithm.

The transaction information and transaction signature are recorded electronically in a memory device within the network. An exemplary data structure containing the transaction data and a transaction signature includes a header portion used for transmission within the network. A transaction information portion contains some or all of the transaction information. This may include the transaction time, validation number, ticket amount, etc. A transaction signature portion contains the transaction signature corresponding to the transaction information contained in the transaction information portion. In one embodiment, the data structure is included in a network packet sent over a network from a central database to a gaming machine. This may occur, for example, when the gaming machine requests validation of a ticket from the central database.

A process flow may be used to record a transaction signature after a player completes one or more games on a playing machine. The process flow begins with a request to finish interaction with a gaming machine. At this point, a processor within the machine may calculate one or more transaction elements associated with the transaction, e.g., the time and cash out value. The cash out value after interaction with the gaming machine may include winnings from the gaming machine. The transaction elements are then sent to a central processor for the network which is coupled to a central database. The central processor having then identifies one or more transaction information elements associated with the cash out transaction. These elements (inputs 355) are ordered by logic 370 to produce inputs 350 which are then used by logic 375 to calculate a transaction signature result (result 380) for the transaction.

The transaction information and transaction signature may then be stored. In one embodiment, the transaction information and transaction signature are recorded in the central database of the gaming network. In addition, the transaction information and transaction signature may also be recorded in additional memory locations. The transaction information and transaction signature may be stored in various ways. In one embodiment, the transaction information and transaction signature are stored together as a new record in a database after each transaction. In another embodiment where transaction information is updated in a progressive record, each time transaction information is updated in the database, an updated transaction signature is automatically attached to the transaction information. In this manner, the most recent transaction signature is verified whenever the transaction information is accessed.

Upon subsequent access to the transaction information, either for redemption by a gaming machine or at cash-out, the transaction signature is verified. Verifying the transaction signature includes verification between the transaction signature stored in the database (constituting a first instance) and a transaction signature calculated based on the transaction information at the time of access (constituting a second instance). The transaction information used at the time of access may include transaction information obtained from a credit device used with a gaming machine. Any discrepancies between the current calculated transaction signature and the transaction signature stored in the database may be investigated. In this manner, any alteration to the transaction information in the database may be detected. In some embodiments, the transaction information may additionally be verified upon subsequent access to the transaction information. Verifying the transaction information may include verification between the transaction information stored in the database and the transaction information at the time of access by a credit device in a gaming machine, for example.

In one embodiment, a transaction signature is verified each time transaction information related to the transaction signature is updated and each time the transaction information is accessed, e.g., for redemption at a cashier's station. Note that this need not be associated with a credit transaction such as redemption. It may also occur at random times, when triggered by a database integrity check, for example. In one embodiment, when credit devices are to be redeemed, only credit devices with valid transaction signatures are allowed redemption. In another embodiment, when transaction information is retrieved from the database to be sent to a cashier's station or a gaming machine, only transaction information having a valid transaction signature is sent. In either case, a system audit log may be created and maintained that contains the results of requests for transaction information and includes requests which contain requests for transaction information having invalid transaction signatures.

In accordance with the technique described herein, in this transaction signing example, values of transaction information elements (inputs 355) need not be provided in the same order in both instances for successful verification. These values are ordered in both instances by logic 370 to produce inputs 350 which are used by logic 375 (using a CRC or other order dependent algorithm) to produce signature result 380. In a simple example, in a first instance the original inputs 355 may be a sequence of values of transaction information elements occurring as 100, 25, 37, 5, 80 and in a second instance the original inputs 355 may be a sequence of values specified as 80, 25, 37, 5, 100. In the example, if control 360 specifies sorting from low to high, ordered inputs 350 is a sequence of values 5, 25, 37, 80, 100 in both first and second instances. Since inputs 350 are the same in both instances in the example, logic 375 produces the same signature result 380 in both instances.

Agile algorithms and other related subject matter is disclosed in co-assigned, co-pending U.S. patent application Ser. No. 12/895,130, filed Sep. 30, 2010, reference no. EMC-10-115, entitled "AGILE OTP GENERATION", the entirety of which patent application is hereby incorporated by reference herein.

An algorithm that includes a device ID, and other related subject matter is disclosed in co-assigned, co-pending U.S. patent application Ser. No. 12/827,045, filed Jun. 30, 2010, reference no. EMC-07-092, entitled "DEVICE BOUND OTP GENERATION", the entirety of which patent application is hereby incorporated by reference herein.

What is claimed is:

1. A computer-implemented method for use in ordering inputs for order dependent processing, the method comprising:
deriving, by a processor in separate instances, ordered inputs from original inputs, the original inputs in the separate instances being in different orders, the original inputs relating to one of an authentication password and a transaction signature, the ordered inputs having an order based on values of their respective original inputs;
providing the ordered inputs to an order dependent processing logic such that a result can be produced; and
in response to providing the ordered inputs to the order dependent processing logic, producing a first result and a second result for use in the one of the authentication password and the transaction signature, wherein the first result and the second result are produced from their respective ordered inputs such that the first result and the second result are similar regardless of the order of their respective original inputs; and wherein the one of the authentication password and the transaction signature is generated from the ordered inputs, and the ordered inputs relating to the transaction signature comprise transaction information from a particular transaction.

2. The method of claim 1, wherein the ordered inputs are provided for one time password (OTP) calculations.

3. The method of claim 1, wherein the ordered inputs are provided for transaction signing calculations.

4. The method of claim 1, wherein a sorting function is used to derive the ordered inputs, based on the values of the original inputs.

5. The method of claim 1, wherein a sorting function is used to derive the ordered inputs, and all ordered inputs are known prior to the derivation.

6. The method of claim 1, wherein communicating to a server the order of the original inputs is avoided.

7. The method of claim 1, wherein the original inputs have a different order that matches user requirements.

8. The method of claim 1, wherein the ordered inputs are combined by a combination function to generate an authentication code.

9. The method of claim 1, wherein the original inputs comprise a secret and a time-varying value.

10. A system for use in ordering inputs for order dependent processing, the system comprising:
a hardware processor comprising a program logic for carrying out the steps of:
first logic deriving, in separate instances, ordered inputs from original inputs, the original inputs in the separate instances being in different orders, the original inputs relating to one of an authentication password and a transaction signature, the ordered inputs having an order based on values of their respective original inputs;
second logic providing the ordered inputs to an order dependent processing logic such that a result can be produced; and
in response to providing the ordered inputs to the order dependent processing logic, third logic producing a first result and a second result for use in the one of the authentication password and the transaction signature, wherein the first result and the second result are produced from their respective ordered inputs such that the first result and the second result are similar regardless of the order of their respective original inputs; and wherein the one of the authentication password and the transaction signature is generated from the ordered inputs, and the ordered inputs relating to the transaction signature comprise transaction information from a particular transaction.

11. The system of claim 10, wherein the ordered inputs are provided for one time password (OTP) calculations.

12. The system of claim 10, wherein the ordered inputs are provided for transaction signing calculations.

13. The system of claim 10, wherein a sorting function is used to derive the ordered inputs, based on the values of the original inputs.

14. The system of claim 10, wherein a sorting function is used to derive the ordered inputs, and all ordered inputs are known prior to the derivation.

15. The system of claim 10, wherein communicating to a server the order of the original inputs is avoided.

16. The system of claim 10, wherein the original inputs have a different order that matches user requirements.

17. The system of claim 10, wherein the ordered inputs are combined by a combination function to generate an authentication code.

18. The system of claim 10, wherein the original inputs comprise a secret and a time-varying value.

* * * * *